United States Patent Office 3,211,637
Patented Oct. 12, 1965

3,211,637
HOMOPOLYMERS OF 4-CHLOROPERFLUORO-
HEPTADIENE-1,6
Leo A. Wall and James E. Fearn, Washington, D.C.,
assignors to the United States of America as represented
by the Secretary of the Navy
No Drawing. Filed Aug. 31, 1962, Ser. No. 220,920
1 Claim. (Cl. 260—92.1)
(Granted under Title 35, U.S. Code (1952), sec. 266)

The invention described herein may be manufactured and used by or for the Government of the United States of America for governmental purposes without the payment of any royalties or fees thereon or therefor.

The present invention relates to a novel halo-diene and to polymers and telomers thereof. More particularly, this invention relates to new and useful halo-polymeric and telomeric compositions ranging from relatively low molecular weight, liquid polymers to high molecular weight solid polymers including greases, waxes, resins and elastomers.

Flourine-containing polymers ranging from low molecular weight oils to high melocular weight plastics are of outstanding industrial importance due to their marked high thermal and chemical resistance. With the advent of missiles and rockets there has arisen a critical need for materials capable of withstanding temperatures of over 1,000° F. at pressures above 1800 p.s.i. in highly oxidative atmospheres. The fluorine-containing polymers of the prior art have been found not suitable for these requirements.

Accordingly, it is an object of the present invention to provide a particularly novel, useful fluorine-containing monomer and polymer and telomer thereof.

Another object is to provide new and useful fluorine-containing diene and to provide a process for the manufacture thereof.

Yet another object of this invention is to provide new and useful fluorine-containing polymers having excellent thermal and oxidative resistance characteristics.

Still another object of the invention is to provide a class of polymers, members of which depending on their molecular weight and chemical structure, are useful as coolants, solvents, plasticisers, lubricants and plastics with novel properties, the members consisting substantially of carbon, chlorine, and fluorine.

Another object of the present invention is to provide plastic materials whose characteristic chemical and thermal stability render them widely useful in the handling of corrosive materials.

Another object of the invention is to provide plastic materials which have a high degree of thermal stability.

Various other objects and many of the attendant advantages of this invention will be readily appreciated as the same becomes better understood by reference to the following detailed description and disclosure.

The above objects are accomplished by the preparation of 4-chloroperfluoroheptadiene-1,6 and the polymerization and telomerization thereof to polymers and telomers having the above described properties.

This compound can be prepared in the following manner:

Five pounds (5 moles) of 2, 4, 6, 7-tetrachloroperfluoroactanic acid was added to 200 grams (5 moles) of sodium hydroxide dissolved in 3 liters of water. The mixture was carefully adjusted to pH 7 and chilled. The sodium salt was filtered with suction, dried in air and pumped continuously under high vacuum for several days. The resulting salt was anhydrous and extremely hygroscopic.

Five pounds of the dry sodium salt was pyrolyzed under pressure in a stainless steel tube adapted to a series of Dry Ice-acetone cooled traps. The pyrolysis temperature was approximately 350° C. produced through use of a furnace controlled by two 10 amp Variacs. The pyrolysis proceeded rapidly and smoothly, producing 1560 grams of a crude product of 83% yield. This crude product was washed with three portions of a 10% aqueous potassium hydroxide solution, each portion about 10% of the volume of the fluorocarbon. This was followed by washes with similar portions of water. The washed material was dried over anhydrous sodium sulphate and distilled under reduced pressure. The yield was 1400 grams of pure 4,6,7-trichloroperfluoroheptene-1, or 75% yield. Sixty grams of a higher boiling material gave a single peak on the vapor phase chromatograph.

Into a 2-liter flask equipped with stirrer, reflux condenser and dropping funnel a mixture of 500 ml. of bis [2(2-methoxyethoxy)ethyl] ether was added. 140 grams of zinc dust was treated with 100 ml. of hydrochloric acid while suspended in acetone. It was then filtered, dried under vacuum for four hours and then added to the 2-liter flask. The flask and contents were heated to about 60° C. while being stirred. Then 200 grams (0.5 mole) of 4,6,7-trichloroperfluoroheptene-1 was added and the stirring continued. Heating was increased until refluxing was observed, then discontinued until the addition was complete. The mixture was then gently refluxed for one hour and permitted to come to room temperature. The heptadiene and unreacted starting material were then removed from the mixture by attaching a series of Dry Ice-acetone cooled traps to the condensor and pumping a vacuum of less than one mm. of mercury through the system. The solvent did not distill. The mixture of heptene and heptadiene was distilled at 75 mm. Three fractions were collected: Between 35 and 45, 45 and 50, and 50 and 70° C. A vapor phase study showed the first fraction to be two thirds heptadiene and two lower boiling components. The 45–50 fraction was almost pure 4-chloroperfluoroheptadiene-1,6 while the 50–70 fraction contained small amounts of the heptadiene and two higher boiling components. Above 70% virtually pure starting material was recovered. Seventy-five grams of dechlorination products were obtained or about 45% yield. Ninety grams of 45% of starting material were recovered. The remaining ten grams remained in the solvent and upon distillation was converted to tar. Approximately 60 grams of the dechlorination products were estimated to be the desired heptadiene or about 35% conversion on each dechlorination. The starting material was recycled.

The puret fraction obtained from distillation was run through a preparatory scale vapor phase chromatograph and was found to contain trace amounts of all four other dechlorination products. These trace materials were carefully removed before any effort to polymerize or telomerize the compound was expended.

Efforts to polymerize this material through use of azobisisobutyronitrile at 60° C. and ultraviolet radiation at room temperature have been unsuccessful. It appears that a temperature of 100° C. or above is essential for a rapid polymerization reaction to take place. The upper limit of the temperature variable would appear to be the decomposition temperature of the monomer starting material. A more successful polymerization of the 4-chloroperfluoroheptadiene-1,6 was obtained by gamma irradiation of the monomer at 100° C. under autogenous pressure. The speed of the reaction is a function of the dosage of radiation. To produce suitable reaction rates, a dosage of 0.01 to one megarad per hour is sufficient. A suitable source of actinic radiation is cobalt-60. The monomer can be dissolved in any suitable solvent which may or may not be a solvent for the polymer. The following examples are illustrative of the polymerization:

*Experiment 1*

Thirty-three grams (0.1 mole) of 4-chloroperfluoroheptadiene-1,6 were placed in a glass tube attached to a vacuum, frozen with liquid nitrogen and the tube evacuated. The heptadiene was thoroughly degassed by the repeated freezing, pumping, thawing technique and the tube was then sealed. This tube and contents were irradiated for 71 hours by being subjected to a cobalt-60 source at 0.2 megarad per hour and at a temperature of 150° C. A brittle, glassy polymer was obtained in 100% conversion. A sample of this material was dissolved in hexafluorobenzene, precipitated with xylene, redissolved in hexafluorobenzene and put through the freeze dry technique. This material was found to have an intrinsic viscosity of 0.09 when hexafluorobenzene is used as a solvent. A KBr pellet of this polymer indicated the absence of a carbon-carbon double bond.

*Experiment 2*

Ten grams (0.03 mole) of 4-chloroperfluoroheptadiene-1,6 was treated in the same fashion described above excepting that the temperature of reaction was lowered to 100° C. Eight grams of polymer was obtained or 80% conversion. This polymer upon purification as described above and dissolved in hexafluorobenzene showed an intrinsic viscosity of 0.05.

*Experiment 3*

Eleven grams (0.03 mole) of 4-chloroperfluoroheptadiene-1,6 and seventeen grams (0.08 mole) of dibromodifluoromethane were placed in a glass tube and degassed as previously described and subjected to gamma rays, a dose of 0.2 megarad per hour for 71 hours at 150° C. being employed. The material was removed from the tube and distilled under reduced pressure. Nine grams of a viscous oil boiling at 70° C. at 5 mm. was obtained or about 56% yield based on the heptadiene. This material showed no carbon-carbon double bond on infrared determination (no peak at 1750 cm.$^{-1}$). Its boiling range and infrared spectrum is reasonable for the anticipated polymer product:

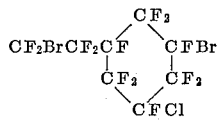

3-bromo-5-chloro-β-bromoperfluoroethylcyclohexane

Also obtained was six grams of grease, apparently a low molecular weight polymer. The ranges of temperature and dosage of radiation for this reaction are the same as those for the polymerization reaction. The polymerized product is useful as a lubricant or as a gyroscopic fluid or can be used as an intermediate in the synthesis of perfluorostyrene by methods well known in the art. The fact that 4-chloroperfluoroheptadiene-1,6 can be polymerized and telomerized under these conditions indicates the likelihood of a cyclic mechanism since it is known that perfluoroheptene can be polymerized only with great difficulty and under extremes of temperature and pressure. This cyclic mechanism is illustrated by the reaction scheme below.

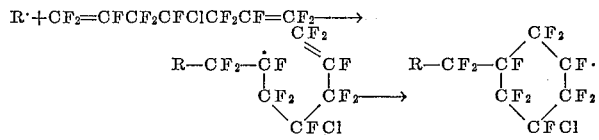

Repetition of this polymerization step produces a polymer whose repeating unit is:

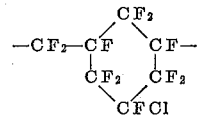

It is believed such intramolecular polymerization is cleaner, i.e., less side or unwanted reactions will occur in the fully or nearly fully fluorinated heptadienes. Fluorinated hexadienes and octadienes would be expected to also polymerize or telomerize better than their hydrocarbon analogues, giving, of course, respectively, chains with five carbon atom and seven carbon atom rings. If the polymerization took place in the 1,2 position as it often does with the butadienes, a pendant unsaturated group would remain. However, in both the polymer and the telomer such is not the case. In infrared studies of both polymer and telomer no bond has been observed at 1750 reciprocal centimeters and the telomer does not absorb bromine. A conceivable structure of the heptadiene polymer would be:

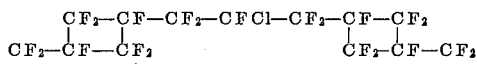

in which polymerization occurs via a dimerization of the double bonds producing cyclobutane groups. However, this type of polymerization cannot explain the telomer which was produced. Hence, it appears more probable that the structure of the polymer is the one containing cyclohexane rings.

It should be understood that the operating conditions may be varied widely depending upon the nature of the reactants, solvents, the proportions used and the results desired. The time required for carrying out the reaction may vary from several minutes to a few days, also depending on the nature and concentration of the reactants and other process conditions such as temperature, pressure and dosage of radiation.

It should be understood, of course, that the foregoing disclosure relates to only preferred embodiments of the invention and that numerous modifications or alterations may be made therein without departing from the spirit and scope of the invention as set forth in the appended claim.

What is claimed is:

The homopolymer poly-4-chloroperfluoroheptadiene-1,6.

References Cited by the Examiner

UNITED STATES PATENTS 2,865,824   12/58   Borland et al. _____ 204—163
3,037,010   5/62    Harris _____ 260—92.1
3,080,430   1/63    Cohen _____ 260—653

OTHER REFERENCES

Wall et al.: Society of Plastics Engineers Transactions, vol. 3, pages 231–4 (1963).

JOSEPH L. SCHOFER, *Primary Examiner.*

JOHN H. MACK, *Examiner.*